UNITED STATES PATENT OFFICE 2,663,707

AMINO PIPERAZINES AND METHODS OF PREPARING THE SAME

Edward A. Conroy, Plainfield, and Robert P. Parker, Somerville, N. J., assignors to American Cyanamid Company, New York, N. Y., a corporation of Maine No Drawing. Application June 22, 1951, Serial No. 233,126

9 Claims. (Cl. 260—256.4)

This invention relates to 1,4-substituted piperazines. More particularly, it relates to 1-substituted - 4 - (N-substituted-amino)-piperazine compounds and methods of preparing the same.

The compounds of the present invention may be illustrated by the following general formula:

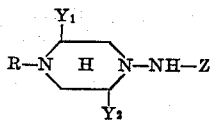

in which R is a radical selected from the group consisting of alkyl, aralkyl, monocyclic aryl, carbalkoxy, dialkylcarbamyl and heterocyclic radicals, the bond from the nitrogen in the piperazine ring to the heterocyclic ring being to a

group; $Y_1$ and $Y_2$ are selected from the group consisting of hydrogen and methyl; Z is selected from the group consisting of a carbalkoxy, a carbamyl, a thiocarbamyl, and an acyl radical.

The compounds of the present invention being 1-substituted - 4 - (N-substituted-amino)-piperazines, the piperazine ring is shown as saturated. However, in addition to the 1,4-substituents the carbon atoms of the piperazine ring may be substituted as shown at $Y_1$ and $Y_2$. Either $Y_1$ or $Y_2$, or both, may be hydrogen or methyl. The invention therefore contemplates 1,4-disubstituted mono- and dimethyl piperazines.

The compounds of the present invention are in general crystalline solids. They are only slightly soluble in water or petroleum ether but somewhat more soluble in lower aliphatic alcohols, chloroform, and the like.

The preparation of the new compounds of the present invention may be accomplished in several ways depending, for the most parts, on the nature of the substituent illustrated by Z in the general formula. When Z is a carbalkoxy, a carbamyl or an acyl radical the reaction may be illustrated by the following equation:

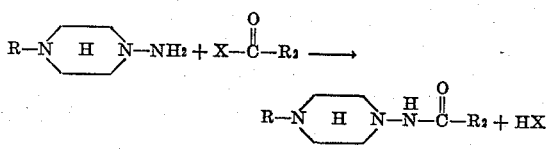

in which R is as defined above, X is halogen and $R_2$ is an alkyl, aryl, aralkyl, alkoxy, aralkoxy or

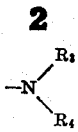

radical, the radicals $R_3$ and $R_4$ being alkyl radicals such as methyl, ethyl, propyl, butyl, amyl, etc., aryl radicals such as phenyl, halophenyl and the like. In introducing an acyl radical into the 1-substituted-4-aminopiperazine molecule an acid anhydride may be used as well as an acid halide.

When it is desirable to prepare compounds wherein Z is a mono-substituted carbamyl or thiocarbamyl radical we prefer to prepare the compounds by the addition of an organic isocyanate or isothiocyanate to the appropriate 1-substituted-4-aminopiperazine in a solvent such as diethyl ether. This process may be represented as follows wherein $R_5$ is an alkyl or monocyclicaryl radical:

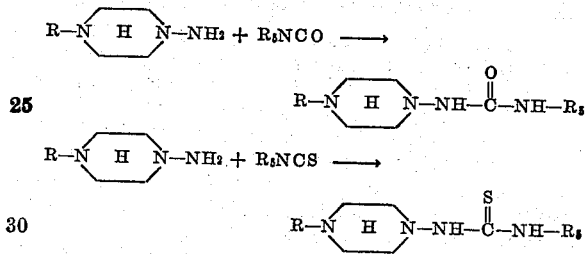

To prepare those compounds wherein Z is a benzene sulfonyl radical we prefer to react the appropriate 1 - substituted - 4 - aminopiperazine with a benzene sulfonyl chloride in aqueous media in the presence of an acid accepting agent such as sodium hydroxide. This process in which Hal is halogen may be represented as follows:

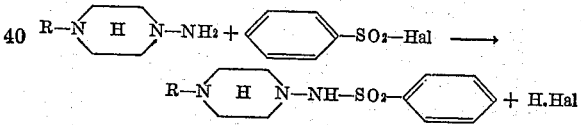

In general, the temperature at which these reactions may be carried out is not critical. If necessary, it may be carried out between 0° C. and the boiling point of the particular solvent. However, for practical reasons, the temperature range of about 0° C. to 100° C. is to be preferred.

The desired product can usually be isolated from the reaction mixture by simple filtration where the product is a solid. In those cases where the product is in the form of an oil it can be extracted from the reaction mixture in a suitable solvent and recovered by removal of the solvent. If it is desirable to have the product in a state of higher purity than it is after isolation, the product may be recrystallized from a suitable solvent which in general would depend upon the particular compound being purified.

The compounds of the present invention in which R is alkyl or aralkyl form salts with strong acids. These salts are therapeutically equivalent to the base compounds and can be used in a similar manner.

The compounds of the present invention are active pharmaceutical products possessing activity as central nervous system depressants: anticonvulsants, sedatives, anesthetics and analgesics.

The preparation of compounds typical of the present invention is more fully shown in the following examples which are given by way of illustration only and not by way of limitation. All parts are by weight unless otherwise indicated.

EXAMPLE 1

*Ethyl N - (4-carbethoxy-1-piperazyl) carbamate*

In a solution of 35.0 parts of 1-carbethoxy-4-aminopiperazine in 80 parts of absolute ethanol is suspended 21.0 parts of sodium bicarbonate. The temperature of the suspension is kept below 50° C., with stirring, while a solution of 21.5 parts of ethyl chlorocarbonate in 80 parts of absolute ethanol is added portionwise over a period of fifteen minutes. Then the reaction mixture is refluxed for two hours and filtered. The solvent is removed from the filtrate by distillation and the residual product, ethyl N-(4-carbethoxy - 1 - piperazyl) carbamate, when crystallized from diethyl ether, melts at 143.5°-144.5° C.

EXAMPLE 2

*1-carbethoxy-4-acetylaminopiperazine*

A solution of 34.6 parts of 1-carbethoxy-4-aminopiperazine and 20.5 parts of acetic anhydride in 150 parts of glacial acetic acid is heated on a water bath for half an hour. The reaction mixture is then poured into a solution of 500 parts of cold water and 180 parts of concentrated aqueous ammonia (26.5° Bé.) and the resulting solution is extracted with chloroform. The solvent is removed from the extract by distillation and the residual product, 1-carbethoxy-4-acetylaminopiperazine, when crystallized from acetone, melts at 180.5°-181.0° C.

EXAMPLE 3

*1-carbethoxy-4-phenylacetylaminopiperazine*

In a solution of 34.6 parts of 1-carbethoxy-4-aminopiperazine in 175 parts of benzene is suspended 26.5 parts of soda ash. The temperature of the suspension is kept below 50° C., with stirring, while 100 parts of a 2.0 molar solution of alpha-toluyl chloride in benzene is added portionwise over a period of ten minutes. Then the reaction mixture is refluxed for one hour, diluted with 180 parts of absolute ethanol and filtered. The solvent is removed from the filtrate by distillation and the residual product, 1-carbethoxy-4-phenylacetylaminopiperazine, when crystallized from ethyl acetate, melts at 138.0°-139.0° C.

EXAMPLE 4

*1-phenyl-3-(4-carbethoxy-1-piperazyl) urea*

In 150 parts of diethyl ether is dissolved 26.0 parts of 1-carbethoxy-4-aminopiperazine and to this is added, over a period of ten minutes, a solution of 18.0 parts of phenyl isocyanate in 75 parts of diethyl ether. During the addition, the reaction mixture is stirred and cooled in an ice-bath while the product separates from the solution as a white solid. The product is removed by filtration and crystallized from a mixture of acetone and n-hexane. The product, 1-phenyl-3 - (4 - carbethoxy - 1-piperazyl) urea, melts at 143.5°–144.5° C.

EXAMPLE 5

*1-cyclohexyl-3-(4-carbethoxy-1-piperazyl) urea*

In 150 parts of diethyl ether is dissolved 26.0 parts of 1-carbethoxy-4-aminopiperazine and to this is added, over a period of five minutes, a solution of 19.0 parts of cyclohexyl isocyanate in 75 parts of diethyl ether. During the addition, the reaction mixture is stirred and cooled in an ice-bath while the product precipitates from the solution as a white solid. The product is removed by filtration and crystallized from a mixture of acetone and n-hexane. The product, 1-cyclohexyl-3-(4-carbethoxy-1-piperazyl) urea, melts at 159.5°–160.5° C.

EXAMPLE 6

*1-phenyl-3-(4-carbethoxy-1-piperazyl)-2-thiourea*

In 200 parts of diethyl ether is dissolved 34.6 parts of 1-carbethoxy-4-aminopiperazine and 27.0 parts of phenyl isothiocyanate. The product, which slowly separates from the solution upon standing as a white solid, is removed by filtration and crystallized from absolute ethanol. The product, 1-phenyl-3-(4-carbethoxy-1-piperazyl)-2-thiourea, melts at 189.0°–190.0° C.

EXAMPLE 7

*1-allyl-3-(4-carbethoxy-1-piperazyl)-2-thiourea*

In 200 parts of diethyl ether is dissolved 26.0 parts of 1-carbethoxy-4-aminopiperazine and 15.0 parts of allyl isothiocyanate. The product, which slowly separates from the solution upon cooling as a white solid, is removed by filtration and crystallized from a mixture of acetone and n-hexane. The product, 1-allyl-3-(4-carbethoxy-1-piperazyl)-2-thiourea, melts at 132.0°–133.0° C.

EXAMPLE 8

*Ethyl N-(4-diethylcarbamyl-1-piperazyl)-carbamate*

In a solution of 40.0 parts of 1-diethylcarbamyl-4-aminopiperazine in 80 parts of absolute ethanol is suspended 26.5 parts of soda ash. The temperature of the suspension is kept below 50° C., with stirring, while a solution of 21.5 parts of ethyl chlorocarbonate in 80 parts of absolute ethanol is added portionwise over a period of fifteen minutes. Then the reaction mixture is refluxed for two hours and filtered. The solvent is removed from the filtrate by distillation and the residue is distilled at 5.0 mm., the fraction boiling at 200°–205° C. being collected as the product, ethyl N-(4-diethylcarbamyl-1-piperazyl)-carbamate.

EXAMPLE 9

*1-diethylcarbamyl-4-acetylaminopiperazine*

A solution of 37.0 parts of 1-diethylcarbamyl-4-aminopiperazine and 20.5 parts of acetic anhydride in 150 parts of glacial acetic acid is heated on a water bath for half an hour. The reaction mixture is then poured into a solution of 500 parts of cold water and 180 parts of concentrated aqueous ammonia (26.5° Bé.) and the resulting solution is extracted with chloroform. The solvent is removed from the extract by distillation and the residual product, 1-diethylcarbamyl-4-acetylaminopiperazine, when crystallized from a mixture of acetone and diethyl ether, melts at 85.5°–86.5° C.

EXAMPLE 10

*1-diethylcarbamyl-4-benzoylaminopiperazine*

In 150 parts of a 5% aqueous sodium hydroxide solution is dissolved 37.0 parts of 1-diethylcarbamyl-4-aminopiperazine and to this is added portionwise, over a period of ten minutes, 28.1 parts of benzoyl chloride. During the addition, the reaction mixture is stirred and cooled in an ice-bath while the product separates from the reaction mixture as a viscous yellow oil. The product is removed with the aid of chloroform and the solvent is removed from the extract by distillation. The residue, 1-diethylcarbamyl-4-benzoylaminopiperazine, when crystallized from a mixture of acetone and diethyl ether, melts at 111.0°–112.0° C.

EXAMPLE 11

*1-phenyl-3-(4-diethylcarbamyl-1-piperazyl)urea*

In 150 parts of diethyl ether is dissolved 27.7 parts of 1-diethylcarbamyl-4-aminopiperazine and to this is added, over a period of ten minutes, a solution of 18.0 parts of phenyl isocyanate in 75 parts of diethyl ether. During the addition, the reaction mixture is stirred and cooled in an ice-bath while the product separates from the solution as a white solid. The product is removed by filtration and crystallized from a mixture of acetone and n-hexane. The product, 1-phenyl-3-(4-diethylcarbamyl-1-piperazyl)urea, melts at 111.0°–113.0° C.

EXAMPLE 12

*1-cyclohexyl-3-(4-diethylcarbamyl-1-piperazyl)urea*

In 150 parts of diethyl ether is dissolved 27.7 parts of 1-diethylcarbamyl-4-aminopiperazine and to this is added, over a period of ten minutes, a solution of 19.0 parts of cyclohexyl isocyanate in 75 parts of diethyl ether. During the addition, the reaction mixture is stirred and cooled in an ice-bath while the product separates from the solution as a white solid. The product is removed by filtration and crystallized from n-hexane. The product, 1-cyclohexyl-3-(4-diethylcarbamyl-1-piperazyl)urea, melts at 98.0°–99.5° C.

EXAMPLE 13

*1-ethyl-3-(4-diethylcarbamyl-1-piperazyl)-2-thiourea*

In 200 parts of diethyl ether is dissolved 30.0 parts of 1-diethylcarbamyl-4-aminopiperazine and 13.0 parts of ethyl isothiocyanate. The ether is removed from the solution by heating on a water bath and the residual product is crystallized from a mixture of acetone and n-hexane. The product, 1-ethyl-3-(4-diethylcarbamyl-1-piperazyl)-2-thiourea, melts at 146.0°–147.0° C.

EXAMPLE 14

*N-(4-diethylcarbamyl-1-piperazyl)-4-chlorobenzenesulfonamide*

In 300 parts of a 10% aqueous sodium hydroxide solution is dissolved 50.0 parts of 1-diethylcarbamyl-4-aminopiperazine and to this is added portionwise, over a period of fifteen minutes, 51.5 parts of fine ground 4-chlorobenzenesulfonyl chloride. During the addition, the reaction mixture is stirred while the temperature spontaneously rises to 50° C. Stirring is continued for half an hour at 50° C. and then the reaction mixture is filtered. The white precipitate which forms upon acidifying the filtrate with 50 parts of glacial acetic acid is removed by filtration and dissolved in 200 parts of a 5% aqueous sodium hydroxide. After treating with activated charcoal and filtering, the product is precipitated from the solution by first acidifying with 25 parts of concentrated hydrochloric acid and then making ammoniacal with 10 parts of concentrated aqueous ammonia (26.5° Bé.). The product, N-(4-diethylcarbamyl-1-piperazyl)-4-chlorobenzenesulfonamide, when crystallized from aqueous ethanol, melts at 150.5°–151.5° C.

EXAMPLE 15

*Ethyl-N-(4-methyl-1-piperazyl)carbamate*

In a solution of 34.5 parts of 1-methyl-4-aminopiperazine in 80 parts of absolute ethanol is suspended 37.0 parts of soda ash. The temperature of the suspension is kept below 50° C., with stirring, while a solution of 32.0 parts of ethyl chlorocarbonate in 80 parts of absolute ethanol is added portionwise over a period of fifteen minutes. Then the reaction mixture is refluxed for two hours and filtered. The solvent is removed from the filtrate by distillation and the residue is distilled at 3.0 mm., the fraction boiling at 122°–124° C. being collected as the product, ethyl N-(4-methyl-1-piperazyl)carbamate.

EXAMPLE 16

*1-cyclohexyl-3-(4-methyl-1-piperazyl)urea*

In 150 parts of diethyl ether is dissolved 23.0 parts of 1-methyl-4-aminopiperazine and to this is added, over a period of five minutes, a solution of 25.5 parts of cyclohexyl isocyanate in 75 parts of diethyl ether. During the addition, the reaction mixture is stirred and cooled in an ice bath while the product precipitates from the solution as a white solid. The product is removed by filtration and crystallized from acetone. The product, 1-cyclohexyl-3-(4-methyl-1-piperazyl)urea, melts at 159.5°–160.0° C.

EXAMPLE 17

*1-ethyl-3-(4-methyl-1-piperazyl)-2-thiourea*

In 200 parts of diethyl ether is dissolved 34.5 parts of 1-methyl-4-aminopiperazine and 26.0 parts of ethyl isothiocyanate. The ether is removed from the solution by heating on a water bath and the residual product is crystallized from acetone. The product, 1-ethyl-3-(4-methyl-1-piperazyl)-2-thiourea, melts at 156.2°–156.7° C.

EXAMPLE 18

*Ethyl N-(4-benzyl-1-piperazyl)carbamate*

In a solution of 38.0 parts of 1-benzyl-4-aminopiperazine in 80 parts of absolute ethanol is suspended 26.5 parts of soda ash. The temperature of the suspension is kept below 50° C., with stirring, while a solution of 21.5 parts of ethyl chlorocarbonate in 80 parts of absolute ethanol is added portionwise over a period of fifteen minutes. Then the reaction mixture is refluxed for two hours and filtered. The solvent is removed from the filtrate by distillation and the residual product, ethyl N-(4-benzyl-1-piperazyl)carbamate, when crystallized from n-hexane, melts at 95.5°–96.5° C.

EXAMPLE 19

*1-benzyl-4-acetylaminopiperazine*

A solution of 47.8 parts of 1-benzyl-4-aminopiperazine and 25.6 parts of acetic anhydride in 150 parts of glacial acetic acid is heated on a water bath for half an hour. The reaction mixture is then poured into a solution of 500 parts of cold water and 225 parts of concentrated aqueous ammonia (26.5° Bé.) and the resulting solution is extracted with chloroform. The solvent is removed from the extract by distillation and the residual product, 1-benzyl-4-acetylaminopiperazine, when crystallized from acetone, melts at 136.0°–137.0° C.

EXAMPLE 20

*1-benzyl-4-phenylacetylaminopiperazine*

In 100 parts of benzene is dissolved 38.2 parts of 1-benzyl-4-aminopiperazine and 30 parts of pyridine. The temperature of the solution is kept below 50° C., with stirring, while 200 parts of a 1.0 molar solution of alpha-toluyl chloride in benzene is added portionwise over a period of ten minutes. During the addition, a gummy, orange-colored precipitate forms. After heating the reaction mixture on a water bath for one hour, the benzene supernate is decanted and discarded and the precipitate is dissolved in 200 parts of 95% aqueous ethanol. The amber colored oil which separates upon diluting the alcoholic solution with 500 parts of cold water is removed and washed several times with cold water, whereupon it crystallizes to a yellow solid. This product, 1-benzyl-4-phenylacetylaminopiperazine, when crystallized from acetone, melts at 161.0°–161.7° C.

EXAMPLE 21

*1-benzyl-4-benzoylaminopiperazine*

In 200 parts of a 5% aqueous sodium hydroxide solution is dissolved 47.8 parts of 1-benzyl-4-aminopiperazine and to this is added portionwise, over a period of ten minutes, 35.2 parts of benzoyl chloride. During the addition, the reaction mixture is stirred and cooled in an ice-bath while the product separates from the reaction mixture as a yellow solid. The product is removed with the aid of chloroform and the solvent is removed from the extract by distillation. The residue, 1-benzyl-4-benzoylaminopiperazine, when crystallized from acetone, melts at 173.0°–174.0° C.

EXAMPLE 22

*1-phenyl-3-(4-benzyl-1-piperazyl)urea*

In 100 parts of diethyl ether is dissolved 28.5 parts of 1-benzyl-4-aminopiperazine and to this is added, over a period of fifteen minutes, a solution of 18.0 parts of phenyl isocyanate in 50 parts of diethyl ether. During the addition, the reaction mixture is stirred and cooled in an ice-bath while the product separates from the solution as a white solid. The product is removed by filtration and crystallized from aqueous ethanol. The product, 1-phenyl-3-(4-benzyl-1-piperazyl)urea, melts at 135.0°–135.5° C.

EXAMPLE 23

*1-phenyl-3-(4-benzyl-1-piperazyl)-2-thiourea*

In 100 parts of diethyl ether is dissolved 28.5 parts of 1-benzyl-4-aminopiperazine and to this is added, over a period of fifteen minutes, a solution of 20.5 parts of phenyl isothiocyanate in 50 parts of diethyl ether. During the addition, the reaction mixture is stirred and cooled in an ice-bath while the product separates from the solution as a white solid. The product is removed by filtration and crystallized from a mixture of acetone and absolute ethanol. The product, 1-phenyl-3-(4-benzyl-1-piperazyl)-2-thiourea, melts at 180.5°–182.0° C.

EXAMPLE 24

*Ethyl N-[4-(4-chlorophenyl)-1-piperazyl]-carbamate*

In a solution of 31.8 parts of 1-(4-chlorophenyl)-4-aminopiperazine in 250 parts of absolute ethanol is suspended 21.0 parts of soda ash. The temperature of the suspension is kept below 50° C., with stirring, while a solution of 16.2 parts of ethyl chlorocarbonate in 80 parts of absolute ethanol is added portionwise over a period of ten minutes. Then the reaction mixture is refluxed for one hour and filtered while hot. The product separates as white crystals from the filtrate upon cooling and is removed by filtration. The product, ethyl N-[4-(4-chlorophenyl)-1-piperazyl]-carbamate, when crystallized from acetone, melts at 194.5°–195.5° C.

EXAMPLE 25

*1-(4-chlorophenyl)-4-acetylaminopiperazine*

A solution of 42.3 parts of 1-(4-chlorophenyl)-4-aminopiperazine and 20.5 parts of acetic anhydride in 150 parts of glacial acetic acid is heated on a water bath for half an hour. The reaction mixture is then poured into 500 parts of cold water whereupon the product separates from the solution as a white solid and is removed by filtration. The product, 1-(4-chlorophenyl)-4-acetylaminopiperazine, when crystallized from absolute ethanol, melts at 211.5°–213.0° C.

EXAMPLE 26

*1-phenyl-3-[4-(4-chlorophenyl)-1-piperazyl]urea*

In 750 parts of diethyl ether is dissolved 42.3 parts of 1-(4-chlorophenyl)-4-aminopiperazine and to this is added a solution of 24.0 parts of phenyl isocyanate in 75 parts of diethyl ether. The product separates from the solution as a white solid and is removed by filtration. The product, 1-phenyl-3-[4-(4-chlorophenyl)-piperazyl]urea, when crystallized from chlorobenzene, melts at 230.5°–231.0° C.

EXAMPLE 27

*1-(2-chlorophenyl)-3-[4-(4-chlorophenyl)-1-piperazyl]urea*

In 400 parts of diethyl ether is dissolved 21.2 parts of 1-(4-chlorophenyl)-4-aminopiperazine and to this is added a solution of 15.4 parts of o-chlorophenyl isocyanate in 75 parts of diethyl ether. The product separates from the solution as a white solid and is removed by filtration. The product, 1-(2-chlorophenyl)-3-[4-(4-chlorophenyl)-1-piperazyl]urea, when crystallized from chloroform, melts at 238.5°–239.0° C.

EXAMPLE 28

*1,1-diethyl-3-[4-(4-chlorophenyl)-1-piperazyl]urea*

In 1,200 parts of diethyl ether is dissolved 84.6 parts of 1-(4-chlorophenyl)-4-aminopiperazine and 27.1 parts of diethylcarbamyl chloride. The reaction mixture is allowed to stand at 25°–35° C.

for several days and is then filtered. The solvent is removed from the filtrate by distillation and the residual product, 1,1-diethyl-3-[4-(4-chlorophenyl)-1-piperazyl]urea, when crystallized from n-hexane, melts at 108.5°–109.0° C.

EXAMPLE 29

*1 - allyl - 3 - [4 - (4 - chlorophenyl) - 1 - piperazyl]-2-thiourea*

In 750 parts of diethyl ether is dissolved 42.3 parts of 1-(4-chlorophenyl)-4-aminopiperazine and 20.0 parts of allyl isothiocyanate. The product, which slowly separates from the solution upon standing as a white solid, is removed by filtration and crystallized from absolute ethanol. The product, 1-allyl-3-[4-(4-chlorophenyl)-1-piperazyl]-2-thiourea, melts at 198.5°–200.0° C.

EXAMPLE 30

*Ethyl N-[4-(2-pyridyl)-1-piperazyl]carbamate*

In a solution of 35.0 parts of 1-(2-pyridyl)-4-aminopiperazine in 80 parts of absolute ethanol is suspended 26.5 parts of soda ash. The temperature of the suspension is kept below 50° C., with stirring, while a solution of 21.5 parts of ethyl chlorocarbonate in 80 parts of absolute ethanol is added portionwise over a period of fifteen minutes. Then the reaction mixture is refluxed for two hours and filtered. The solvent is removed from the filtrate by distillation and the residual product, ethyl N-[4-(2-pyridyl)-1-piperazyl]carbamate, when crystallized from diethyl ether, melts at 133.0°–134.0° C.

EXAMPLE 31

*1-(2-pyridyl)-4-acetylaminopiperazine*

A solution of 35.7 parts of 1-(2-pyridyl)-4-aminopiperazine and 20.5 parts of acetic anhydride in 150 parts of glacial acetic acid is heated on a water bath for half an hour. The reaction mixture is then poured into a solution of 500 parts of cold water and 180 parts of concentrated aqueous ammonia (26.5° Bé.) and the resulting solution is extracted with chloroform. The solvent is removed from the extract by distillation and the residual product, 1-(2-pyridyl)-4-acetylaminopiperazine, when crystallized from acetone, melts at 172.5°–173.5° C.

EXAMPLE 32

*1-phenyl-3-[4-(2-pyridyl)-1-piperazyl]urea*

In 350 parts of diethyl ether is dissolved 35.0 parts of 1-(2-pyridyl)-4-aminopiperazine and to this is added, over a period of ten minutes, a solution of 24.0 parts of phenyl isocyanate in 75 parts of diethyl ether. During the addition, the reaction mixture is stirred and cooled in an ice-bath while the product separates from the solution as a white solid. The product is removed by filtration and crystallized from acetone. The product, 1-phenyl-3-[4-(2-pyridyl)-1-piperazyl]urea, melts at 179.0°–180.0° C.

EXAMPLE 33

*1-allyl-3-[4-(2-pyridyl)-1-piperazyl]-2-thiourea*

In 300 parts of diethyl ether is dissolved 35.0 parts of 1-(2-pyridyl)-4-aminopiperazine and 20.0 parts of allyl isothiocyanate. The product, which slowly separates from the solution upon cooling as a white solid, is removed by filtration and crystallized from absolute ethanol. The product, 1-allyl-3-[4-(2-pyridyl)-1-piperazyl]-2-thiourea, melts at 155.0°–156.0° C.

EXAMPLE 34

*N-[4-(2-pyridyl)-1-piperazyl]-4-chlorobenzenesulfonamide*

In 500 parts of a 10% aqueous sodium hydroxide solution is dissolved 35.7 parts of 1-(2-pyridyl)-4-aminopiperazine and to this is added portionwise, over a period of fifteen minutes, 42.2 parts of finely ground 4-chlorobenzenesulfonyl chloride. During the addition, the reaction mixture is stirred while the temperature spontaneously rises to 50° C. Stirring is continued for half an hour at 50° C. and then the reaction mixture is filtered. The yellow precipitate which forms upon acidifying the filtrate with 80 parts of glacial acetic acid is removed by filtration and dissolved in 600 parts of a 5% aqueous sodium hydroxide solution. After treating with activated charcoal and filtering, the product is precipitated from the solution by acidifying with 50 parts of glacial acetic acid. The product, N-[4-(2-pyridyl)-1-piperazyl]-4-chlorobenzenesulfonamide, when crystallized from absolute ethanol, melts at 173.0°–174.5° C. with decomposition.

EXAMPLE 35

*Ethyl N-[4-(2-pyrimidyl)-1-piperazyl]-carbamate*

In a solution of 26.9 parts of 1-(2-pyrimidyl)-4-aminopiperazine in 150 parts of absolute ethanol is suspended 21.0 parts of soda ash. The temperature of the suspension is kept below 50° C., with stirring, while a solution of 16.2 parts of ethyl chlorocarbonate in 80 parts of absolute ethanol is added portionwise over a period of ten minutes. Then the reaction mixture is refluxed for one hour and filtered while hot. The product separates as white crystals from the filtrate upon cooling and is removed by filtration. The product, ethyl N-[4-(2-pyrimidyl)-1-piperazyl]carbamate, when crystallized from a mixture of acetone and n-hexane, melts at 186.5°–187.5° C.

EXAMPLE 36

*1-(2-pyrimidyl)-4-acetylaminopiperazine*

A solution of 35.8 parts of 1-(2-pyrimidyl)-4-aminopiperazine and 20.5 parts of acetic anhydride in 150 parts of glacial acetic acid is heated on a water bath for half an hour. The reaction mixture is then poured into a solution of 500 parts of cold water and 200 parts of concentrated aqueous ammonia (26.5° Bé.) whereupon the product separates from the solution as a white solid and is removed by filtration. The product, 1-(2-pyrimidyl)-4-acetylaminopiperazine, when crystallized from absolute ethanol, melts at 248.0°–249.5° C.

EXAMPLE 37

*1-cyclohexyl-3-[4-(2-pyrimidyl)-1-piperazyl]-urea*

In 150 parts of diethyl ether is dissolved 35.8 parts of 1-(2-pyrimidyl)-4-aminopiperazine and to this is added, over a period of five minutes, a solution of 25.5 parts of cyclohexyl isocyanate in 75 parts of diethyl ether. During the addition, the reaction mixture is stirred and cooled in an ice-bath while the product separates from the solution as a white solid. The product is removed by filtration and crystallized from acetone. The product, 1-cyclohexyl-3-[4-(2-pyrimidyl)-1-piperazyl]urea, melts at 200.5°–201.5° C.

EXAMPLE 38

*1-ethyl-3-[4-(2-pyrimidyl)-1-piperazyl]-2-thiourea*

In 200 parts of diethyl ether is dissolved 35.8 parts of 1-(2-pyrimidyl)-4-aminopiperazine and 17.4 parts of ethyl isothiocyanate. The ether is removed from the solution by heating on a water bath and the residual product is crystallized from absolute ethanol. The product, 1-ethyl-3-[4-(2-pyrimidyl)-1-piperazyl]-2-thiourea, melts at 206.5°–208.0° C.

We claim:

1. Compounds having the general formula:

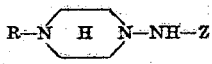

in which R and Z are a lower carbalkoxy radical.

2. Compounds having the general formula:

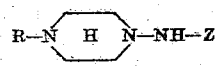

in which R is the 2-pyridyl radical and Z is a lower carbalkoxy radical.

3. Compounds having the general formula:

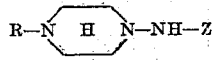

in which R is a benzyl radical and Z is a carbamyl radical.

4. Ethyl N-(4-carbethoxy-1-piperazyl)carbamate.

5. Ethyl N-[4-(2-pyridyl)-1-piperazyl]carbamate.

6. 1-phenyl-3-(4-benzyl-1-piperazyl)urea.

7. 1-allyl-3-[4-(4-chlorophenyl)-1-piperazyl]-2-thiourea.

8. Ethyl N-[4-(2-pyrimidyl)-1-piperazyl]carbamate.

9. Compounds of the group having the formula:

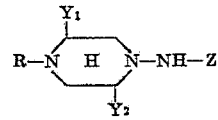

in which R is a radical selected from the group consisting of lower alkyl, monocyclic aralkyl, dicyclic aralkyl, monocyclic aryl, lower carbalkoxy, di-lower-alkylcarbamyl, pyridyl and pyrimidyl radicals in which the bond from the nitrogen in the piperazine ring to the heterocyclic ring is to a

group; $Y_1$ and $Y_2$ are selected from the group consisting of hydrogen and methyl; Z is selected from the group consisting of a lower carbalkoxy, a carbamyl, a thiocarbamyl and an acyl radical.

EDWARD A. CONROY.
ROBERT P. PARKER.

No references cited.